United States Patent

[11] 3,593,122

| [72] | Inventors | Robert D. Barton<br>Houston;<br>Fenton M. Wood, Sugarland, both of, Tex. |
|---|---|---|
| [21] | Appl. No. | 810,953 |
| [22] | Filed | Mar. 27, 1969 |
| [45] | Patented | July 13, 1971 |
| [73] | Assignee | AMF Incorporated<br>New York, N.Y. |

[54] METHOD AND APPARATUS FOR IDENTIFYING HARDSPOTS IN MAGNETIZABLE MATERIAL
13 Claims, 5 Drawing Figs.

| [52] | U.S. Cl. | 324/37 |
|---|---|---|
| [51] | Int. Cl. | G01r 33/12 |
| [50] | Field of Search | 324/37 |

[56] References Cited
UNITED STATES PATENTS

| 2,317,721 | 4/1943 | Barnes | 324/37 |
|---|---|---|---|
| 2,869,073 | 1/1959 | McKee et al | 324/37 |

*Primary Examiner*—Rudolph V. Rolinec
*Assistant Examiner*—R. J. Corcoran
*Attorneys*—George W. Price and John H. Gallagher ABSTRACT: Hardspots are detected in a steel pipeline by noting the unique relationship existing between the relative magnitudes of the flux leakage detection signals caused by different types of anomalies, the compared signals, being produced by separately inspecting the pipeline with an active magnetic flux field and with a residual magnetic flux field.

ACTIVE FIELD LOG

RESIDUAL FIELD LOG

FW = FIELD WELDS
CW = COLD WORK BANDS
HS = HARD SPOTS
Ch = RECORDING CHANNELS

INVENTORS
ROBERT D. BARTON
FENTON M. WOOD

BY
John H. Gallagher
ATTORNEY

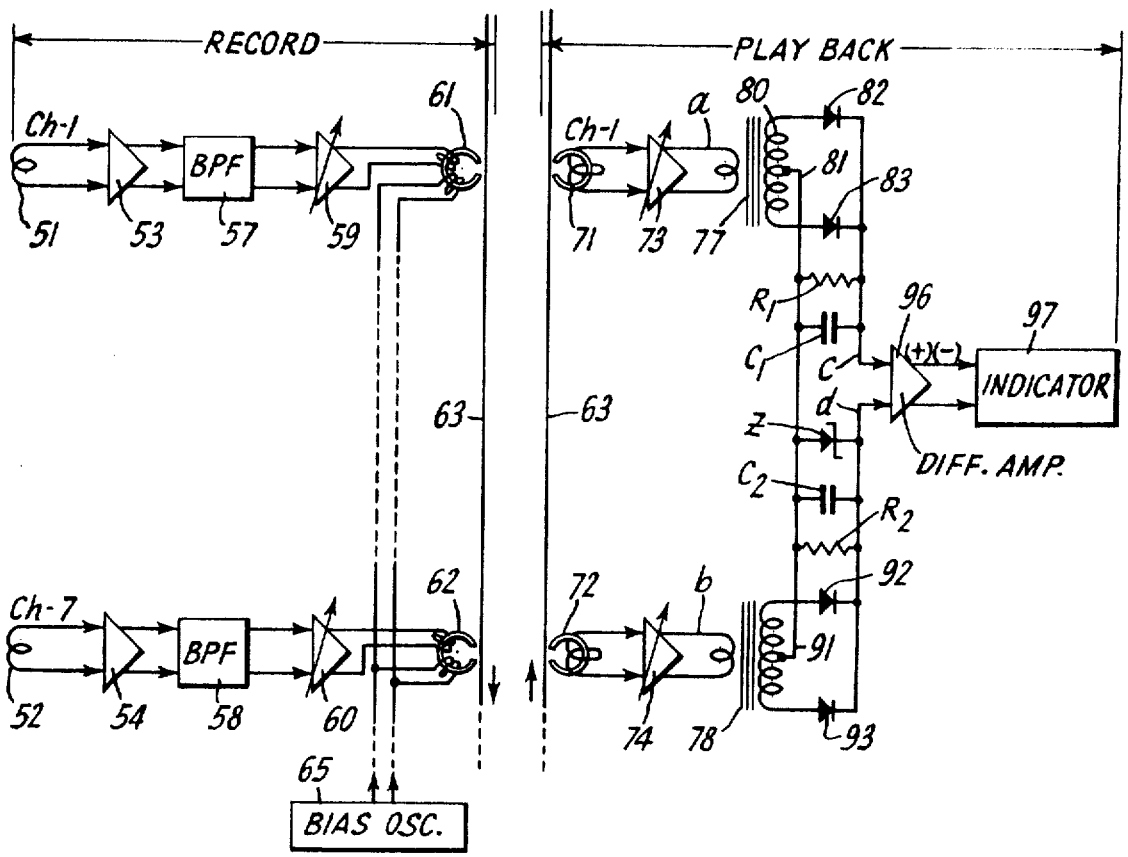
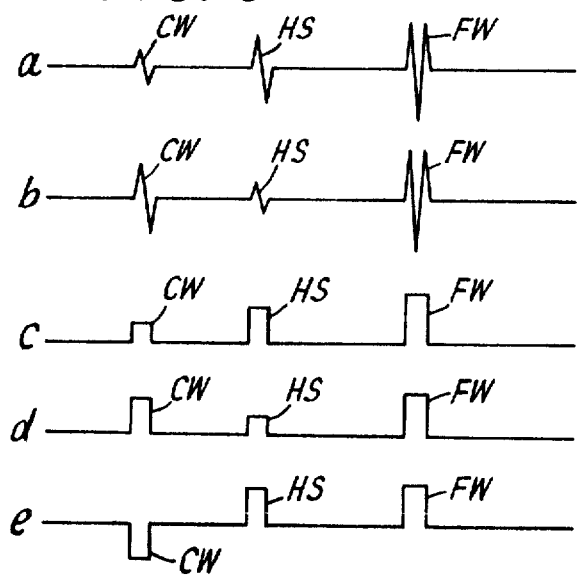

METHOD AND APPARATUS FOR IDENTIFYING HARDSPOTS IN MAGNETIZABLE MATERIAL

BACKGROUND OF THE INVENTION

A leak in a buried pipeline that transports natural gas or a petrochemical product represents a dangerous and/or costly situation. Investigation of failures in the walls of pipelines has revealed that some failures result from stress cracks that develop in severely hardened areas in the wall of the pipeline. Further investigation revealed that one cause of such hardened areas, or hardspots, is accidental quenching of the steelplate, of which the pipe is formed, while the plate was being rolled or cooled in the steel mill.

If these hardspots can be detected in existing pipelines, the sections of pipe in which they are present may be replaced, thus eliminating a potentially hazardous condition. One well-known method of detecting hardspots in ferromagnetic tubular members such as pipes is to pass a longitudinally directed magnetic flux through the wall of the pipe to bring it into or near the magnetic saturation condition. The magnetic field source then is removed or deenergized. The metallurgical and magnetic properties of the hardspots are different from those of the material of the remainder of the pipe. Normally the hardspots will retain a stronger residual magnetism than will the remainder of the material of a pipe after the previously mentioned magnetic field has been applied and removed. Known magnetic inspection techniques then may be used to locate the hardspots.

The hardspot detection technique just described has been used quite successfully to test many types of pipe. However, that technique has been found not to be reliable for testing some types of large-diameter pipes which are made by forming steelplates into a tubular form and welding the abutting edges of the formed plate. The reason why the technique is not successful with some pipes of this type is that the pipes sometimes are subjected to considerable nonuniform cold working during their formation, i.e., as by the action of an expander pig which acts on successive and overlapping short sections of the pipe to slightly expand the pipe and bring it into "true round." This nonuniform cold working leaves some regions of the pipe wall in conditions of greater internal strain than others. These regions of greater strain have greater residual magnetism characteristics, and during inspection by the above-discussed technique, will produce signals in the magnetic inspection apparatus which are somewhat like signals produced by hardspots. Consequently, an operator of the inspection apparatus can not distinguish with certainty a signal resulting from a hardspot, which is an objectionable anomaly in the pipe, from a signal resulting from a cold work region, which ordinarily is not an objectionable anomaly in the pipe. Cold work anomalies also result from other causes such as cold bending and accidental denting of the pipe so that the difficulty discussed above may occur in the inspection of many types of pipes.

A pipeline inspection technique which results in the inability to distinguish a hardspot from a cold work anomaly in the wall of a pipeline is virtually worthless because it is not reasonable to excavate the buried line at every location where a flaw signal was detected and then conduct some sort of further test to determine if a hardspot does in fact exist at that location.

SUMMARY OF THE INVENTION

Hardspots are identified and distinguished from cold work anomalies in a steel member by magnetically inspecting the member with both an active magnetic flux field and a residual magnetic flux field. Respective records, or logs, are made of anomalies detected during the two inspections. Comparing the two logs, the relative magnitudes of signals corresponding to a given anomaly enables one to identify whether a cold work anomaly or a hardspot anomaly caused the detected signals. If the anomaly is a hardspot, the signal recorded when inspecting with the active magnetic field is larger in magnitude than the signal caused by the same hardspot and recorded when inspecting with the residual magnetic field. Signals resulting from a cold work anomaly have just the opposite relationship, i.e., the signal recorded when inspecting with the residual magnetic field is larger in magnitude than the signal caused by the same cold work anomaly and recorded when inspecting with the active magnetic field. The gains of all signal channels of the inspection apparatus are properly adjusted to assure that the described relationships always exist.

Magnetic flux leakage detectors used for both inspections are substantially insensitive to small anomalies such as cracks and corrosion pits, thereby eliminating signals corresponding thereto from the recordings.

BRIEF DESCRIPTION OF THE DRAWINGS

FIG. 4 is a simplified circuit diagram showing means that automatically distinguishes between hardspot and cold work anomaly signals; and FIG. 5 are simplified waveforms that are referred to in describing the operation of the circuit diagram of FIG. 4.

DETAILED DESCRIPTION OF THE INVENTION

Figure 1:
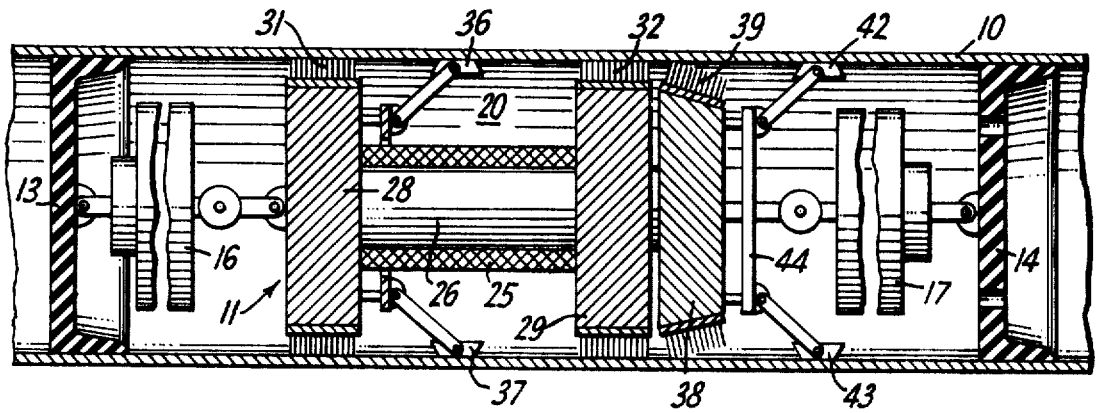
FIG. 1 is a simplified illustration of a pipeline pig adapted for the practice of the present invention.

A pipeline pig device, illustrated in a simplified and somewhat schematic form in FIG. 1, may be used to simultaneously make two magnetic inspections that include respective recordings of magnetic flux inspection signals, one recording being associated with an active magnetic flux field inspection and one with a residual magnetic flux field inspection. As used in this description, active magnetic flux field is a field established in the pipeline wall by a magnetic flux source which is present and operating to establish that flux field, while the term residual flux field is the flux field remaining in the pipe wall after a magnetizing source has been removed or deactivated.

A section of a pipeline 10 to be inspected for hardspots contains an instrumented pipeline pig 11 which is adapted to be propelled through the pipeline from right to left by the fluid product being transported through the pipeline. The pig includes front and back resilient packers 13 and 14 which are in sliding contact with the pipeline wall and which provide the support and propulsion means for the apparatus. Fluidtight equipment containers 16 and 17 may contain the battery packs and recording equipment, for example, and are suitably pivoted to packers 13 and 14.

A central section 20 of the pig apparatus is linked to the containers 16 and 17 and contains an electromagnet 25 wound about a rigid core member 26 of a magnetic-flux-conducting material. Magnetic pole pieces 28 and 29 are secured in magnetic-flux-conducting relationship to the respective ends of core 26. Pole pieces 28 and 29 may be circular discs, or radially extending spoked or webbed members, which support at their peripheries the respective wire brush members 31 and 32 which have flexible flux-conducting bristles that make contact with the full circumference of the inner wall of pipeline 10 and conduct magnetic flux thereto. A longitudinally directed active magnetic flux field thus established in the wall of the pipeline between the wire brushes 31 and 32 by an energized electromagnet 25, pole pieces 28 and 29, and the wire brush pole faces 31 and 32. The strength of the active magnetizing field established by electromagnet 25 is chosen so that the portion of the pipeline wall conducting the active flux field is magnetized to the region of the knee of the magnetization curve.

Magnetic flux detector means illustrated as search shoes 36 and 37 are maintained in sliding contact with the wall of pipeline 10 and each shoe contains at least one flux leakage detector coil for detecting leakage magnetic flux adjacent the pipeline wall. The construction and operation of flux leakage detector coils are well known to those skilled in the art and will not be explained in detail except to state that the coils employed in shoes 36 and 37 are relatively large coils having what ordinarily would be called poor resolution for other types of inspection so that they will not produce significant signals in response to rather small cracks and corrosion pits that might be present in the pipeline wall. Consequently, the flux leakage detector coils will produce defect signals in response only to magnetic anomalies which encompass larger regions in the pipeline wall which are characteristic of the hardspots and cold work anomalies. As an example, when inspecting a pipeline having a 20-inch diameter the detector coils may be rectangular in shape with a dimension of 4 to 6 inches in a direction transverse to the pipe axis and a dimension approximately 1 inch in the direction parallel to the pipe axis. Generally speaking, the coils should be larger in area that the anomaly which is to be overlooked.

A third pole piece 38 and wire brush 39 are located adjacent pole piece 29 and also are in magnetic-flux-coupling relationship with core 26. The wire brush 39 extends through 360° and is obliquely inclined with respect to the inner wall of pipeline 10 so that the flux-conducting bristles at the left side of the wire brush 39 are in contact, or very nearly in contact, with the inner circumference of the pipeline wall, but the bristles are progressively spaced further away from the wall in the direction toward the right edge of the wire brush 39. The purpose of the inclined wire brush 39 is to minimize the demagnetization of the pipeline wall as the active magnetic field moves past a section of the pipeline, thereby leaving a stronger longitudinally directed residual flux field in the pipeline wall.

Enhancing the strength of the residual magnetic flux field in the pipeline wall permits a residual magnetic field inspection operation to be conducted simultaneously with the previously described inspection operation utilizing the active magnetizing field as the pig apparatus 11 passes through the pipeline. The inspection operation utilizing the residual magnetic flux field in the pipeline wall is performed by the flux detection means comprised of search shoes 42 and 43 which are suitably attached to a plate 44 secured to the left end of the central section 20 of the pig apparatus. Search shoes 42 and 43 are maintained in contact with the pipeline wall and contain search coils similar to the ones contained in search shoes 36 and 37 that are associated with the active magnetic flux field and which have been described previously.

For simplicity of illustration, only two search shoes have been illustrated for each of the flux leakage detection means associated respectively with the active and residual magnetic fields. In practice, perhaps as many as 12 search shoes will be included in each of the two groups so that substantially complete 360° coverage of the pipeline wall will be accomplished when inspecting with both the active and residual magnetic flux fields. It is to be understood that other types of flux leakage detection means may be utilized without departing from the teachings of the present invention.

Assuming that the pig apparatus 11 moves through pipeline 10 from right to left, and assuming that search shoes 36 and 42 are located at the same azimuthal angle on the pipeline wall, a hardspot or cold work anomaly that is present at that same azimuthal angle will first cause a signal to be generated in the coil in search shoe 36 and then as search shoe 42 later passes over the same anomaly a corresponding signal will be generated in the coil in search shoe 42.

The flux leakage signals detected by the active field detector shoes 36 and 37 and the residual field detector shoes 42 and 43 are coupled by appropriate leads and circuitry to recording means which may be located in container 17, for example. The recording means in container 17 may be any known type suitable for providing, ultimately, a visual record of the flux leakage signals detected by the search coils in the search shoes. It presently is preferred to first record the signals in the pig on multiple-track magnetic tape, each track recording the signals detected by a respective search shoe. After an inspection run is completed, the magnetic tape then is played back, and by use of known apparatus, the signals are transposed to corresponding visual traces on a pen-and-ink strip chart recorder. Alternatively, the records can be made directly with a pen-and-ink recorder in the pig.

Figure 2:
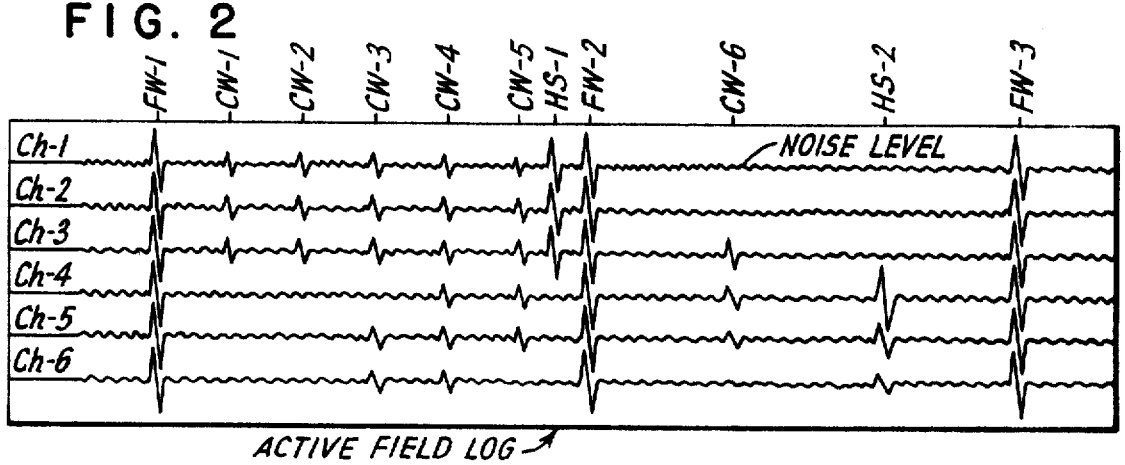
FIGS. 2 and 3 are representations of recordings made in accordance with the teachings of the present invention and which will be referred to in explaining the present invention.
Figure 3:
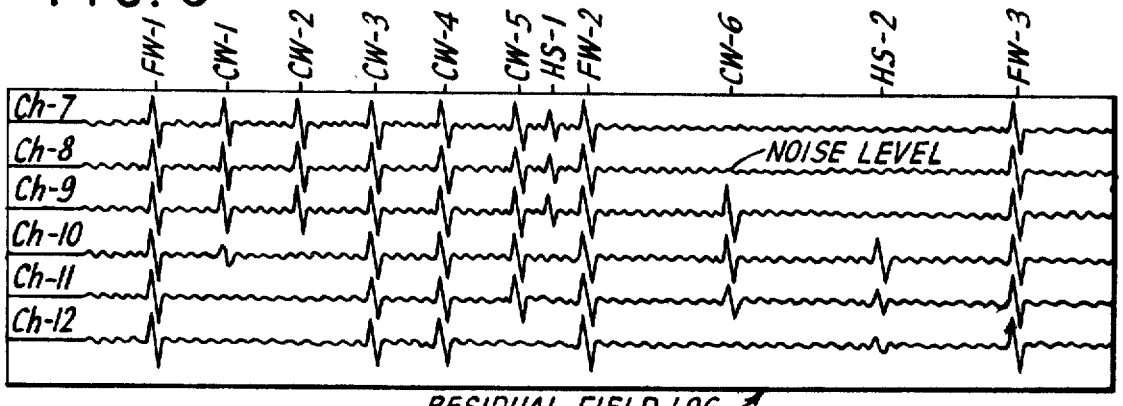

FIGS. 2 and 3 are representations of portions of recorded traces corresponding, respectively, to inspections performed with the active and residual magnetic flux fields. In this example only six recording traces are illustrated for each of the two inspections. In practice, it is likely that many more traces, and thus more search shoes, would be used. The recorded signals of FIGS. 2 and 3 are represented as they might appear on logs obtained on an inspection run after the gains of the signal channels have been properly adjusted for optimum interpretation of the logs, as will be discussed below. Also, corresponding signals on the two logs have been vertically aligned for easy interpretation and comparison.

The traces identified as channels 1 through 6, Ch 1—Ch 6, correspond to signals detected by search coils associated with the active magnetic flux field, and channels 7 through 12, Ch 7—Ch 12, correspond to signals detected by search coils associated with the residual magnetic flux field. The recorded signals FW-1, FW-2, and FW-3, appear in all channels and correspond to signals detected at three different field welds, these being the 360° girth welds that join together adjacent sections of pipe. These field weld signals provide a convenient way of indexing the recordings so that the operator who reads the strip chart can know the section of pipe from which the recorded signals emanate. The signals labeled CW-1 through CW-6 were determined to result from six different cold work anomalies along two successive sections of pipe and the signals labeled HS-1 and HS-2 were determined to result from two different hardspots in the respective sections of pipe. In making the recordings, the signals on channels 1 and 7 came from respective search shoes that had substantially the same azimuthal position in the pipeline. Signals on channels 2 and 8 came from respective search shoes that also had substantially a common azimuthal position in the pipeline. The same is true of the signals on channels 3 and 9, 4 and 10, 5 and 11, and 6 and 12.

The manner of identifying the type of anomaly, cold work or hardspot, which gave use to the different signals is as follows. In comparing recorded signals in the respective pairs of channels 1 and 7, 2 and 8, 3 and 9, etc., in FIGS. 2 and 3, it will be seen that each signal labeled as a cold work anomaly has a larger magnitude on a given channel of the residual field log than on the comparable channel of the active field log. For example, looking at the recorded signals designated CW-1, all of which were caused by the same cold work anomaly, it will be seen that the magnitude of the recorded signal is larger in channel 7 than in channel 1, is larger in channel 8 than in channel 2, and is larger in channel 9 than in channel 3. The signals identified with a particular hardspot change in magnitude between comparable channels of the two logs in just the opposite manner. That is, the signals labeled HS-1 are larger in magnitude on channels 1, 2, and 3 than corresponding signals on respective channels 7, 8, and 9, and signals labeled HS-2 are larger in magnitude on channels 4 and 5 than the corresponding signals on respective channels 10 and 11. By noting how the corresponding signals change in magnitude between corresponding channels on the two recording logs, positive identification as a hard spot or cold work anomaly may be made.

The following notation may be helpful in interpreting the signals in FIGS. 2 and 3 and identifying the anomalies which caused them.

Anomaly:                    Relative signal magnitudes
    Hardspot_____Active field > residual field.
    Cold work_____Residual field > active field.

As previously mentioned, the logs illustrated in FIGS. 2 and 3 are representative of the types of recordings that are obtained in an operative inspection run of the apparatus in which the gains of the signal channels associated with the active flux field search coils and residual flux field search coils have been properly adjusted to permit easy interpretation and identification of the signals on the logs in accordance with the method just described. If the gains of all signal channels were equal, the field weld (FW) signals in the active field signal channels Ch-1 through Ch-6 would be greater in magnitude than the corresponding FW signals in channels Ch-7 through Ch-12 of FIG. 3. Similarly, the recorded general background noise level would have a greater magnitude in the active field signal channels Ch-1 through Ch-6 than in the residual field channels Ch-7 through Ch-12. To properly adjust the equipment in the desired manner, the gains of signal channels Ch-1 through Ch-6 are reduced and/or the gains of channels Ch-7 through Ch-12 are increased until the magnitudes of the recorded field weld signals FW-1, FW-2, FW-3, for example, are substantially equal in all signal channels Ch-1 through Ch-12. The same type of adjustment in signal channel gains may be made by using the magnitudes of the general background noise level as the basis of comparison. The proper adjustments in signal channel gains may be performed after passing the apparatus through a short section of test pipeline having known anomalies therein and prior to inserting the apparatus into an operating section of pipeline to be inspected.

Another way of adjusting the gains of the signal channels to the desired levels is to conduct a test inspection through a short section of test pipeline having known hardspot and cold work anomalies therein. A comparison of the active and residual field logs will reveal that the magnitude of a recorded hardspot signal on the active field log is greater than the magnitude of the corresponding recorded hardspot signal on the residual field log by a ratio that is larger than the ratio of the magnitude of a recorded cold work anomaly signal on the active field log to the magnitude of the corresponding recorded cold work anomaly signal on the residual field log. This relationship of ratios may be expressed as follows, wherein HS and CW respectively refer to hardspot and cold work signal magnitudes.

$$\frac{\text{HS (active)}}{\text{HS (residual)}} > \frac{\text{CW (active)}}{\text{CW (residual)}}$$

These relative relationships may be recognized by close inspection of the two logs, and once signals having the above-expressed relationship have been identified, the signals corresponding to cold work and hardspot anomalies readily may be distinguished. After the signals are distinguished, the gains of the signal channels are adjusted until the magnitude of a cold work anomaly signal on the residual field log is greater than the magnitude of the corresponding cold work anomaly signal on the active field log, and the magnitude of a hardspot signal on the active field log is greater than the magnitude of the corresponding hardspot signal on the residual field log. Once the relationships are established the task of distinguishing between hardspot signals and cold work anomaly signals is further simplified. Speaking quite generally, the desired relationships of FIGS. 2 and 3 will exist when the gains of the residual field signal channels Ch-7 through Ch-12 are approximately four to five times the gains of the active field signal channels Ch-1 through Ch-6.

As described above, hardspots may be distinguished from cold work anomalies by visually interpreting the two logs of FIGS. 2 and 3. This requires considerable time on the part of the operator and can be quite fatiguing. Consequently, once the equipment is properly adjusted in the manner previously explained, electronic means may be utilized to identify the hardspot and the cold work anomaly signals. FIG. 4 is a simplified illustration of means that automatically identifies the two different types of anomaly signals. In FIG. 4, only one signal channel associated with the active magnetic flux field inspection apparatus, Ch-1, and only one signal channel associated with the residual magnetic flux field inspection apparatus, Ch-7, are illustrated in order to simplify the drawing. The additional signal channels actually used in the apparatus would be instrumented similarly and would operate in a similar manner.

Search coils 51 and 52 are respectively associated with the active and residual field inspection apparatus, and both search the same azimuthal portion of the pipeline as the inspection apparatus travels therethrough. The search coils are respectively coupled through amplifiers 53 and 54, band pass filters 57 and 58, and adjustable gain amplifiers 59 and 60 to the respective magnetic recording heads 61 and 62 which cause signals to be recorded on a magnetic tape 63 which moves past the recording heads 61 and 62 in the direction indicated by the arrow. A bias oscillator 65 provides AC biasing signals to the recording heads 61 and 62 as is customary in the art. All the recording heads associated with the active and residual field signal channels may be aligned transversely across the width of the recording tape, or they may be staggered individually or in groups across the width of the tape.

As previously stated, it presently is preferred to record the signals on the magnetic tape 63 carried in the pig apparatus of FIG. 1, and then remove and play back the tape to obtain a visual readout after the inspection run has been completed. During playback, the magnetic tape 63 having recorded thereon the signals corresponding to detected hardspots and cold work anomalies is transported past magnetic pickup heads 71 and 72 which transduce the recorded signals to electrical signals that are respectively coupled through adjustable gain amplifiers 73 and 74 to the primary windings of transformers 77 and 78. Simplified illustrations of signals on the primary winding of transformer 77 are illustrated in FIG. 5a. Secondary winding 80, center tap 81, diodes 82 and 83, together with resistor $R_1$ and capacitor $C_1$ provide full wave detection of the signals applied to the primary winding of transformer 77. The detected output of transformer 77 is illustrated by the wave form of FIG. 5c.

Playback channel Ch-7, which is a residual field inspection channel, operates in a similar manner in that pickup 72 transduces the recorded signal and produces an electrical signal which is amplified in adjustable gain amplifier 74 and applied to the primary winding of transformer 78. This signal is illustrated by the waveform of FIG. 5b.

The secondary winding of transformer 78, diodes 92 and 93, resistor $R_2$ and capacitor $C_2$ constitute a full wave detector whose output is illustrated by the waveform of FIG. 5d.

In accordance with the teachings of the present invention, the gains of the active field and residual field signal channels Ch-1 and Ch-7 of FIG. 4 have been adjusted so that the magnitude of the hardspot signal HS is larger in the active field signal channel, FIGS. 5a and 5C3 than is the corresponding signal in the residual field signal channel, FIGS. 5b and 5d. The relative magnitudes of the cold work anomaly signals are just the opposite. That is, the CW signal in the residual field signal channels, FIGS. 5b and 5d, are greater in magnitude than the corresponding CW signal in the active field signal channel, FIGS. 5a and 5c. The adjustable gain amplifiers 59, 60, 73 and 74 illustrated in FIG. 4, or other suitable means, may be adjusted to provide the desired levels of gain in the respective signal channels.

The waveforms of FIGS. 5c and 5d are coupled to the two input terminals of a bipolar difference amplifier 96 which is a known type of circuit whose operation in response to the simultaneously occurring signals applied to its two input terminals will be evident by referring to the waveforms of FIGS. 5c, 5d, and 5e. The magnitude of the CW signal of FIG. 2d, the residual field signal, is greater than the corresponding CW signal of FIG. 5c, the active field signal, and difference amplifier 96 will operate in response thereto to produce a negative polarity output signal as illustrated in FIG. 5e. The relative magnitudes of the hardspot signals HS of FIGS. 5c and 5d are just the opposite, the active field signal of FIG. 5c being the larger. Difference amplifier 96 will respond to these two input signals to produce the positive polarity HS signal of FIG. 5e. Accordingly, because of the unique relationship that will exist between the relative magnitudes of the hardspot and cold work anomaly signals at the inputs to bipolar difference amplifier 96, a hardspot signal always will appear at the output as a positive polarity signal and a cold work anomaly signal always will appear at the output as a negative polarity signal. These bipolar output signals of difference amplifier 96 may be recorded on an indicator device 97 which may be a pen-and-ink recorder or a light beam recorder, which then provides a permanent record on which the hardspot signals may be easily and quickly identified.

It should be understood that other types of difference amplifiers may be used in the place of the one described. For example, the difference amplifier may be of the known type that will produce a unipolar output signal only when the hardspot signal of FIG. 5c is greater in magnitude than the corresponding HS signal of FIG. 5d. This type of circuitry will identify only hardspots and will ignore cold work anomalies.

Because it is desirable that field weld signals FW appear on the recorded output to aid in indicating distance on the record, precaution must be taken to assure that the simultaneously occurring and substantially equal magnitude FW signals of FIG. 5a and 5b are not cancelled in difference amplifier 96. This type of operation is avoided by adding a zener diode Z in one of the full wave detector circuits illustrated in FIG. 4. Zener diode Z in the detector circuit of Ch-7 has a breakdown voltage which is greater than the expected magnitude of a CW or HS signal, but less than the expected magnitude of a FW signal. Accordingly, zenner diode Z will have no effect on the CW and HS signals but will conduct before the FW signal of FIG. 5b reaches its full magnitude, thereby assuring that the FW signal of FIG. 5d is of lesser magnitude than the corresponding FW signal of FIG. 5c. With this arrangement the FW signals simultaneously applied to the two inputs of difference amplifier 96 never will be of equal magnitude, thus assuring a FW output signal which may be recorded.

It is obvious from the above discussion that the respective CW, HS and FW signals in signal channels CH-1 and CH-5 must appear simultaneously at the inputs of difference amplifier 96. Because the active field detector shoes 36 and 37, FIG. 1, are axially spaced from the residual field search shoes 42 and 43, signals corresponding to a given detected anomaly will be generated at different times in the corresponding active and residual field signal channels. Accordingly, appropriate steps must be taken to bring the signals into time coincidence before they are applied to the inputs of difference amplifier 96 of FIG. 4. Means for assuring this time relationship are well known and will not be explained in detail. As an example, time delay circuitry may be included in the active field channels if the magnetic recording and playback heads are aligned transversely across the magnetic tape, or alternatively, the recording and/or playback heads may be physically staggered across the magnetic tape to compensate for the axial displacement of the two groups of search shoes.

In some instances it may be desirable to automatically identify and distinguish hardspot and cold work anomaly signals by means of apparatus contained within the pig apparatus of FIG. 1 rather than including such apparatus in the playback equipment as illustrated in FIG. 4. In such a case the circuitry connected to the search coils which scan the pipeline wall will include a difference amplifier which operates in the same manner discussed above to compare corresponding defect signals produced by a given anomaly during the active and residual field inspections. With this arrangement, only the signals produced by hardspots, and possibly the field weld signals, may be recorded on given channels of the magnetic tape within the pig apparatus. As mentioned above, appropriate measures would have to be taken to assure time coincidence of corresponding signals produced by a given anomaly during the active and residual field inspections. With this arrangement, only the signals produced by hardspots, and possibly the field weld signals, may be recorded on given channels of the magnetic tape within the pig apparatus. As mentioned above, appropriate measures would have to be taken to assure time coincidence of corresponding signals produced during the active and residual field inspections. Furthermore, other types of recording equipment, such as a pen-and-ink recorder, may be used in the place of the magnetic tape recorder in the pig apparatus.

Performing both the active field inspection and the residual field inspection at the same time with one pig apparatus of the type illustrated in FIG. 1 assure that both the active field log and the residual field log will have the same scale factors for both the horizontal time, or distance, axis and for the vertical amplitude axis. This is assured because both scale factors are a function of the velocity of the pig apparatus through the pipeline. If the respective active field and residual field logs were obtained one at a time by separate inspection runs of pigs through the pipeline, the velocities of the pig apparatus would not necessarily be identical for both runs, and correlation of the two logs would be more difficult but still could be performed visually.

What we claim is:

1. In apparatus for inspection of a pipeline made of ferromagnetic material to detect and identify hardspots in said material, said apparatus being propelled through the pipeline and producing signals in response both to detected hardspots and detected cold work anomalies in said material, means for distinguishing the signals produced by hardspots from the signals produced by the cold work anomalies, comprising means for establishing an active magnetic flux field in a portion of said pipeline, means for magnetically inspecting the portion of the pipeline magnetized by the active magnetic flux field and for producing output signals in response to hardspots and cold work anomalies therein, means for establishing a residual magnetic flux field in said portion of the pipeline, means for magnetically inspecting said portion of the pipeline while that portion is magnetized with the residual magnetic flux field and for producing output signals in response to said hardspots and cold work anomalies, means for adjusting the magnitudes of the signals resulting from the two inspections so that the magnitude of a cold work anomaly signal resulting from a residual magnetic flux field inspection is greater than the corresponding cold work anomaly signal resulting from the active magnetic field inspection, means for establishing coincidence between the corresponding signals resulting from the two inspections and produced by the same hardspot or cold work anomaly, and means for comparing the relative magnitudes of corresponding signals produced by the two inspections.

2. The apparatus claimed in claim 1 wherein said two means magnetically inspecting the pipeline includes means constructed and arranged to be responsive to anomalies such as hardspot and cold work anomalies that encompass relatively large regions of a pipeline wall but substantially nonresponsive to cracks and corrosion pits that encompass smaller regions of the pipeline wall.

3. The apparatus claimed in claim 1 wherein said two means for magnetically inspecting the pipeline include flux leakage search coils of generally rectangular configuration and which encompass a large enough area to be substantially nonresponsive to small cracks and corrosion pits which are to be overlooked in the inspections.

4. In apparatus for inspecting a pipeline made of ferromagnetic material to detect and identify hardspots in said material, said apparatus being propelled through the pipeline and producing signals in response both to detected hardspots and detected cold work anomalies in said material, means for distinguishing the signals produced by hardspots from the signals produced by the cold work anomalies, comprising means for establishing an active magnetic flux field in a portion of said pipeline, means for magnetically inspecting the portion of the pipeline magnetized by the active magnetic flux field and for producing output signals in response to hardspots and cold work anomalies therein, means for establishing a residual magnetic flux field in said portion of the pipeline, means for inspecting said portion of the pipeline while that portion is magnetized with the residual magnetic flux field and for producing output signals in response to hardspots and cold work anomalies therein, means for establishing a residual magnetic flux field in said portion of the pipeline, means for inspecting said portion of the pipeline while that portion is magnetized with the residual magnetic flux field and for producing output signals in response to said hardspots and cold work anomalies, magnetic recording means for recording the output signals of said two inspection means transducing means for transducing said magnetic recording signals to related electrical signals, means for establishing time coincidence between the corresponding electrical signals resulting from the two inspections and produced by the same hardspot or cold work anomaly, means for adjusting the magnitudes of the electrical signals resulting from the two inspections so that the magnitude of a cold work anomaly signal resulting from the residual magnetic flux field inspection is greater than the corresponding cold work anomaly signal resulting from the active magnetic flux field inspection, means for comparing the relative magnitudes of corresponding signals produced by the two inspections, and means responsive to the output of the comparing means for providing an indication of the relative magnitudes of compared signals.

5. The apparatus claimed in claim 4 wherein
said two means for magnetically inspecting the pipeline including means constructed and arranged to be responsive to anomalies such as hardspot and cold work anomalies that encompass relatively large regions of a pipeline wall but substantially nonresponsive to cracks and corrosion pits that encompass smaller regions of the pipeline wall.

6. The apparatus claimed in claim 4 wherein
said two means for magnetically inspecting the pipeline include flux leakage search coils of generally rectangular configuration and which encompass a large enough area to be substantially nonresponsive to small cracks and corrosion pits which are to be overlooked in the inspections.

7. The apparatus claimed in claim 4 wherein,
the means for establishing an active magnetic flux field in a portion of said pipeline establishes said active field in a longitudinal direction along said pipeline,
said residual magnetic flux field in the portion of the pipeline being the flux field remaining after the means for establishing the active magnetic flux field has passed by that portion of the pipeline.

8. A method of distinguishing magnetic inspection signals produced by hardspot anomalies in a member of magnetizable material from other magnetic inspection signals caused by cold work anomalies in the member, comprising the steps of
establishing an active magnetic flux field in at least a portion of the member to be inspected,
inspecting with magnetic-flux-responsive means the portion of the member with the active magnetic flux field established therein to produce anomaly signals corresponding to said anomalies in the member,
establishing a residual magnetic flux field in said portion of the member,
inspecting with magnetic-flux-responsive means said portion of the member having the residual magnetic flux field established therein to produce anomaly signals corresponding to said anomalies in the member,
adjusting the magnitudes of anomaly signals so that corresponding hardspot anomaly signals resulting from the active and residual magnetic flux field inspections have a relationship distinguishable from corresponding cold work anomaly signals resulting from said active and residual magnetic field inspections, and
designating as hardspot anomaly signals corresponding signals from the respective inspections having characteristics known to be produced by hardspots in said member.

9. A method of distinguishing magnetic inspection signals produced by hardspot anomalies in a member of magnetizable material from other magnetic inspection signals caused by cold work anomalies in the member, comprising the steps of
establishing an active magnetic flux field in at least a portion of the member to be inspected,
inspecting with magnetic-flux-responsive means the portion of the member with the active magnetic flux field established therein to produce anomaly signals corresponding to said anomalies in the member,
establishing a residual magnetic flux field in said portion of the member,
inspecting with magnetic-flux-responsive means said portion of the member having the residual magnetic flux field established therein to produce anomaly signals corresponding to said anomalies in the member,
adjusting the magnitudes of anomaly signals so that a hardspot anomaly signal resulting from the active magnetic flux field inspection is greater in magnitude than the corresponding hardspot anomaly signal resulting from the residual magnetic field inspection and so that the magnitudes of corresponding cold work anomaly signals resulting from the active and residual magnetic flux field inspections have the opposite relationship,
comparing the relative magnitudes of corresponding anomaly signals resulting from said two inspections, and
identifying as hardspot anomaly signals the corresponding signals from the respective inspections that have a greater magnitude when resulting from the active magnetic field inspection than when resulting from the residual magnetic field inspection.

10. A method of distinguishing magnetic inspection signals produced by hardspot anomalies in an elongated member of magnetizable material from other magnetic inspection signals caused by cold work anomalies in the member, comprising the steps of
establishing an active magnetic flux field in at least portion of the member to be inspected,
inspecting with magnetic-flux-responsive means the portion of the member with the active magnetic flux field established therein to produce anomaly signals corresponding to said anomalies in the member,
recording the anomaly signals produced by the active magnetic field inspection,
establishing a residual magnetic flux field in said member,
inspecting with magnetic-flux-responsive means the same portion of the member with the residual magnetic flux field established therein to produce anomaly signals corresponding to said anomalies in the member,
recording the anomaly signals produced by the residual magnetic field inspection,
the magnetic-flux-responsive means and means for recording the anomaly signals associated with the respective active and residual magnetic flux field inspections including respective signal channels,
comparing the two recordings to identify corresponding signals on the two recordings produced by given anomalies,
at a time prior to said comparing step adjusting the gains of the signal channels relative to each other so that a hardspot anomaly signal resulting from the active magnetic flux field inspection is greater in magnitude than the corresponding hardspot anomaly signal resulting from the residual magnetic field inspection and so that the magnitudes of corresponding cold work anomaly signals resulting from the active and residual magnetic flux field inspections have the opposite relationship, and identifying as anomaly hardspot signals corresponding signals having a magnitude which is greater on the recording made with the active magnetic field inspection than on the recording made with the residual magnetic field inspection.

11. The method claimed in claim 10 wherein the step of comparing two recordings includes, transducing the recorded signals produced by the two inspections to produce corresponding electrical signals, establishing time coincidence between the corresponding signals of the two recordings that were produced by the same anomaly in said member, comparing the magnitudes of corresponding electrical signals of the respective inspections and producing an output signal of a first type when the signal resulting from the active magnetic flux field inspection is greater in magnitude then the corresponding signal produced with the residual magnetic flux field inspection.

12. In apparatus for inspecting a member of ferromagnetic material to detect and identify hardspots in said material, said apparatus producing signals in response both to detected hardspots and detected cold work anomalies in said material, means for distinguishing the signals produced by hardspots from the signals produced by cold work anomalies, comprising means for establishing an active magnetic flux field in a portion of said member, means for magnetically inspecting the portion of the member magnetized by the active magnetic flux field and for producing output signals in response to hardspots and cold work anomalies therein, means for establishing a residual magnetic flux field in said portion of the member, means for magnetically inspecting said portion of the member while that portion is magnetized with the residual magnetic flux field and for producing output signals in response to said hardspots and cold work anomalies, means for adjusting the magnitudes of the signals resulting from the two inspections so that the magnitude or a cold work anomaly signal resulting from a residual magnetic flux field inspection is greater than the corresponding cold work anomaly signal resulting from the active magnetic field inspection and so that the magnitudes of corresponding hardspot anomaly signals resulting from said two inspections have the opposite relationship, means for establishing coincidence between the corresponding signals resulting from the two inspections and produced by the same hardspot or cold work anomaly, and means for comparing the relative magnitudes of corresponding signals produced by the two inspections.

13. The apparatus claimed in claim 12 wherein said two means for magnetically inspecting the member includes means constructed and arranged to be responsive to anomalies such as hardspot and cold work anomalies that encompass relatively large regions of a member but substantially nonresponsive to cracks or corrosion pits that encompass smaller regions of the member.